United States Patent
Kuze et al.

(10) Patent No.: US 10,636,447 B2
(45) Date of Patent: Apr. 28, 2020

(54) OPTICAL DISC DRIVE DEVICE AND PLAYBACK DEVICE

(71) Applicant: PANASONIC INTELLECTUAL PROPERTY MANAGEMENT CO., LTD., Osaka (JP)

(72) Inventors: Yuuichi Kuze, Osaka (JP); Masatoshi Yajima, Osaka (JP); Shinichi Konishi, Nara (JP); Akihiko Nishioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/325,334

(22) PCT Filed: Feb. 7, 2018

(86) PCT No.: PCT/JP2018/004220
§ 371 (c)(1),
(2) Date: Feb. 13, 2019

(87) PCT Pub. No.: WO2018/155186
PCT Pub. Date: Aug. 30, 2018

(65) Prior Publication Data
US 2019/0206438 A1   Jul. 4, 2019

(30) Foreign Application Priority Data

Feb. 24, 2017   (JP) .................................. 2017-033521

(51) Int. Cl.
*G11B 5/09* (2006.01)
*G11B 19/28* (2006.01)
(Continued)

(52) U.S. Cl.
CPC .............. *G11B 19/28* (2013.01); *G11B 7/004* (2013.01); *G11B 7/005* (2013.01); *G11B 19/04* (2013.01);
(Continued)

(58) Field of Classification Search
None
See application file for complete search history.

(56) References Cited

U.S. PATENT DOCUMENTS 5,210,829 A * 5/1993 Bitner ................... G06F 3/0601
                                                       360/31
5,625,615 A * 4/1997 Dente .................. G11B 7/0045
                                                       360/73.01

(Continued)

FOREIGN PATENT DOCUMENTS

JP   H11-016104 A    1/1999
JP   2000-348431 A   12/2000
(Continued)

OTHER PUBLICATIONS

International Search Report and Written Opinion, dated May 15, 2018, in International Patent Application No. PCT/JP2018/004220; with partial English translation.

(Continued)

*Primary Examiner* — Peter Vincent Agustin
(74) *Attorney, Agent, or Firm* — McDermott Will & Emery LLP

(57) ABSTRACT

An optical disc drive device includes a spindle motor that rotates an optical disc, an OPU, a first controller that causes the spindle motor and the OPU to read recorded data from the rotating optical disc, and an transmitter that transmits the read recorded data to a signal processing device disposed external to the optical disc drive device. The recorded data transmitted by transmitter is stored in a buffer provided in (Continued)

the signal processing device. The first controller decreases the rotational speed of the optical disc based on free space information indicating the free space of the buffer.

14 Claims, 9 Drawing Sheets

(51) Int. Cl.
*G11B 19/04* (2006.01)
*G11B 7/005* (2006.01)
*G11B 20/10* (2006.01)
*G11B 7/004* (2006.01)

(52) U.S. Cl.
CPC ............ *G11B 19/041* (2013.01); *G11B 20/10* (2013.01); *G11B 20/10527* (2013.01); *G11B 2020/10675* (2013.01)

(56) References Cited

U.S. PATENT DOCUMENTS

| | | | |
|---|---|---|---|
| 6,246,650 B1 * | 6/2001 | Kuroiwa | G11B 19/04 369/47.38 |
| 2001/0036112 A1 * | 11/2001 | Igami | G11B 19/04 365/200 |
| 2002/0045961 A1 * | 4/2002 | Gibbs | G11B 20/10527 700/94 |
| 2003/0152005 A1 | 8/2003 | Miyamoto | |
| 2005/0007918 A1 * | 1/2005 | Tokudome | G11B 19/26 369/47.36 |
| 2005/0177841 A1 | 8/2005 | Ichikawa | |
| 2019/0206438 A1 * | 7/2019 | Kuze | G11B 7/004 |

FOREIGN PATENT DOCUMENTS

| | | |
|---|---|---|
| JP | 2004-362733 A | 12/2004 |
| JP | 2006-147119 A | 6/2006 |
| JP | 2008-146763 A | 6/2008 |
| JP | 2008-159103 A | 7/2008 |
| JP | 2016-012379 A | 1/2016 |

OTHER PUBLICATIONS

Partial supplementary European Search Report dated Feb. 4, 2020, for the corresponding European Patent Application No. 18758430.5.

* cited by examiner

OPTICAL DISC DRIVE DEVICE AND PLAYBACK DEVICE

CROSS-REFERENCE OF RELATED APPLICATIONS

This application is the U.S. National Phase under 35 U.S.C. § 371 of International Patent Application No. PCT/JP2018/004220, filed on Feb. 7, 2018, which in turn claims the benefit of Japanese Application No. 2017-033521, filed on Feb. 24, 2017, the entire disclosures of which Applications are incorporated by reference herein.

TECHNICAL FIELD

The present disclosure relates to an optical disc drive device and a playback device including the same.

BACKGROUND ART

Patent Literature 1 discloses an optical disc device. In recent years, an ultra-HD BD-ROM (hereinafter also referred to as UHD BD-ROM), which is an optical disc for recording an image content having a large amount of data such as a 4 k-resolution image content has been standardized. Further, to support a UHD BD-ROM, an optical disc drive device that rotates an optical disc at high speed has been commercialized.

CITATION LIST

Patent Literature

PTL 1: Japanese Unexamined Patent Application Publication No. 2008-146763

SUMMARY OF THE INVENTION

Technical Problem

The present disclosure provides an optical disc drive device that allows reduction in noise produced when an optical disc rotates.

Solution to Problem

An optical disc drive device according to the present disclosure includes: a motor that rotates an optical disc; an optical pickup unit (OPU); a controller that causes the motor and the OPU to read recorded data from the optical disc that is rotating; and an transmitter that transmits the recorded data that has been read, to a signal processing device disposed external to the optical disc drive device. The recorded data transmitted by the transmitter is stored in a buffer provided in the signal processing device, and the controller decreases a rotational speed of the optical disc based on free space information indicating a free space of the buffer.

Advantageous Effect of Invention

The present disclosure achieves an optical disc drive device that allows reduction in noise produced when an optical disc rotates.

DESCRIPTION OF EXEMPLARY EMBODIMENTS

Figure 1:
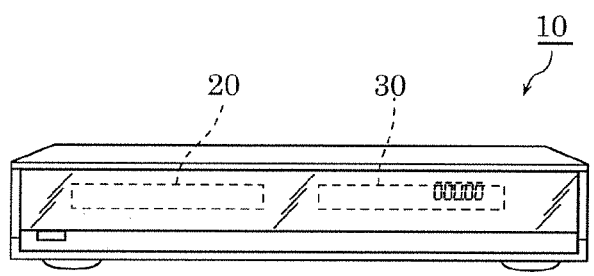
FIG. 1 is an exterior view of a playback device according to Embodiment 1.

Embodiments will be described below in detail with reference to the drawings as appropriate. It is, however, noted that a description made in detail more than necessary is omitted in some cases. For example, a detailed description of an already well-known item and a duplicate description of substantially the same configuration are omitted in some cases. The reason for this is to prevent the following description from being unnecessarily redundant and allow a person skilled in the art to readily understand the present disclosure.

The present inventors provide the accompanying drawings and the following descriptions to allow a person skilled in the art to fully understand the present disclosure, and the accompanying drawings and the following descriptions are not intended to limit the subject set forth in the claims. The accompanying drawings are diagrammatic views and are not necessarily precisely drawn.

Further, in the accompanying drawings, substantially the same configuration has the same reference character, and a duplicate description will be omitted or simplified in some cases.

Embodiment 1

[Configuration of Playback Device]

Figure 2:
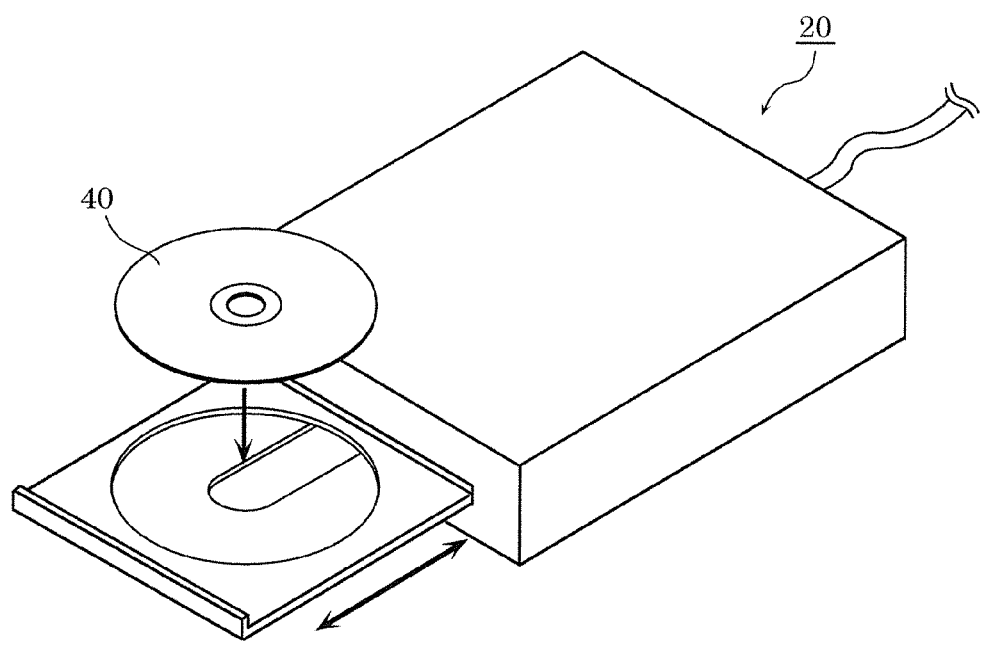
FIG. 2 is an exterior view of an optical disc drive device according to Embodiment 1.
Figure 3:
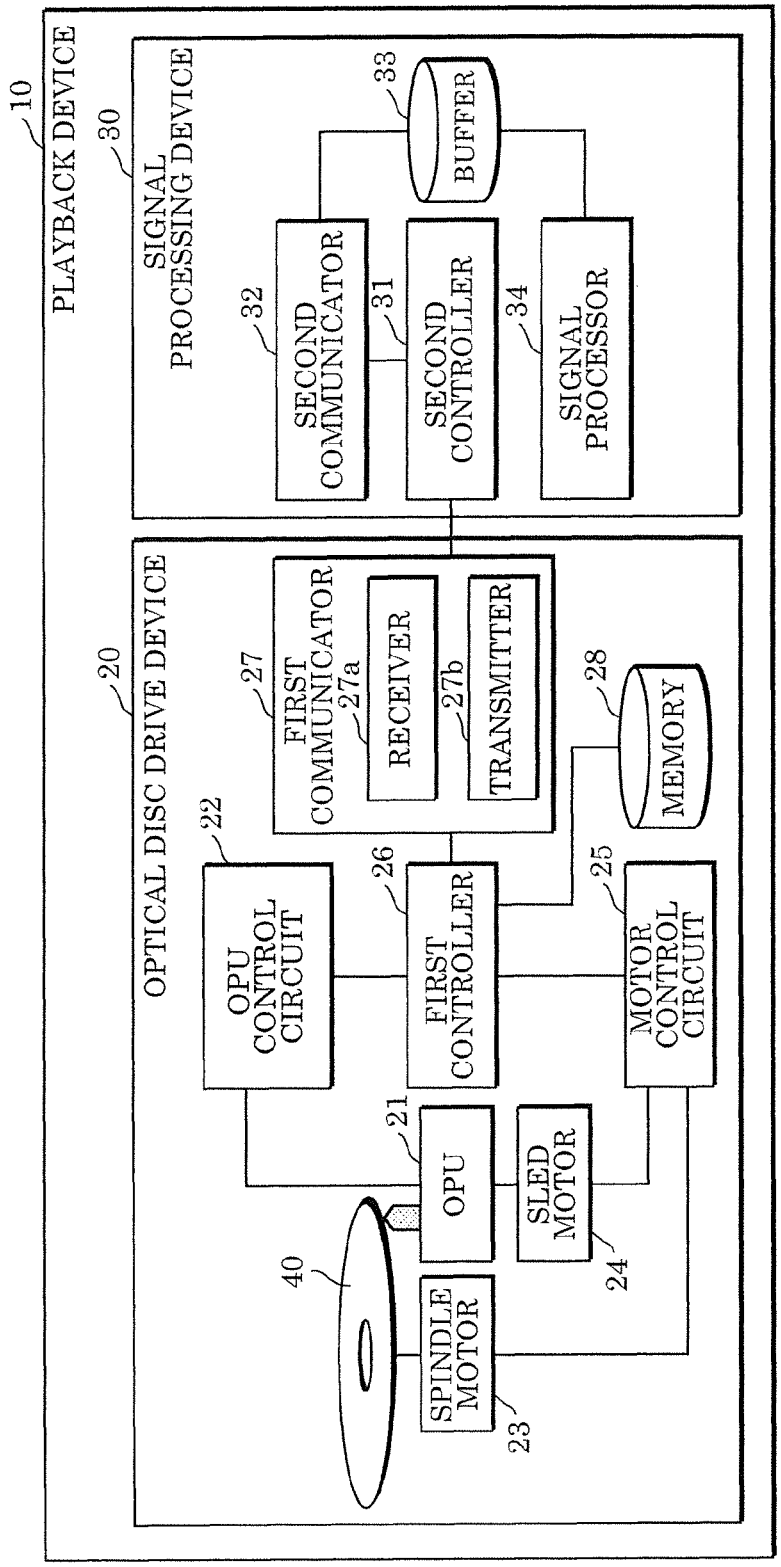
FIG. 3 is a block diagram showing the functional configuration of the playback device according to Embodiment 1.

A playback device according to Embodiment 1 will be described below with reference to the drawings. The configuration of the playback device according to Embodiment 1 will first be described. FIG. 1 is an exterior view of the playback device according to Embodiment 1. FIG. 2 is an exterior view of an optical disc drive device according to Embodiment 1. FIG. 3 is a block diagram showing the functional configuration of the playback device according to Embodiment 1.

Playback device 10 according to Embodiment 1 is a device that plays back optical disc 40, as shown in FIG. 1. Playback device 10 is specifically a BD player and outputs a video signal to a display device (not shown). Playback device 10 includes optical disc drive device 20 and signal processing device 30.

[Optical Disc Drive Device]

The configuration of optical disc drive device 20 will first be described in detail with reference to FIGS. 2 and 3. Optical disc drive device 20 is a device that rotates optical disc 40 and reads recorded data recorded on optical disc 40, as shown in FIG. 2. Optical disc 40 is, for example, a UHD BD-ROM and may instead be a BD-ROM, a BD-R, or any other optical disc. In Embodiment 1, optical disc 40 is an optical disc on which data has been recorded. For example, a motion image content or any other content has been recorded as the recorded data.

Optical disc drive device 20 includes OPU 21, OPU control circuit 22, spindle motor 23, sled motor 24, motor control circuit 25, first controller 26, first communicator 27, and memory 28, as shown in FIG. 3.

OPU 21 focuses a laser beam onto the recording layer of optical disc 40 under the control of OPU control circuit 22 and receives the laser beam reflected off the recording layer of optical disc 40. OPU 21 converts the received laser beam into an electric signal and outputs the electric signal to OPU control circuit 22. OPU 21 outputs, as the electric signal, a signal on which a wobble signal is based, a signal on which a servo error signal is based, a data signal (RF signal), and other signals. OPU 21 is specifically an optical pickup device and includes a laser light source that emits a laser beam, a photodetector that converts the laser beam into an electric signal, and other components.

The wobble signal is present only in recordable optical disc 40 and is a signal according to the wobbling structure of optical disc 40 and indicating the address of the position where the laser beam is focused on a track of optical disc 40. The wobble signal is produced in OPU control circuit 22 based on the signal provided from OPU 21. In the case of optical disc 40 on which data has been already recorded or playback-only optical disc 40, the address is acquired from the data signal (RF signal) present on a track of optical disc 40. In the following description, the "position where the laser beam is focused" on a track of optical disc 40 is also referred to as a "focused position" or a "readout position". The servo error signal is a signal that allows the laser beam to be focused on the recording layer and the focused position to follow a track and is produced in OPU control circuit 22 based on the signal provided from OPU 21. The data signal is a signal indicating data recorded on a track. In the following embodiment, the data signal is also referred to as recorded data.

The servo error signal is a collective name of signals for moving the focused position (optical beam spot) produced by OPU 21 to a desired position on optical disc 40. The servo error signal contains a focus error signal and a tracking error signal.

OPU control circuit 22 is a circuit used by first controller 26 to control OPU 21. OPU control circuit 22 produces the focus error signal and the tracking error signal from the signal which is output from OPU 21 and on which the servo error signal is based. OPU control circuit 22 focuses the laser beam onto the recording layer based on the focus error signal and causes the focused position to follow a track based on the tracking error signal. OPU control circuit 22 includes a drive circuit for driving a laser light emitting element provided in OPU 21. The drive circuit for driving the laser light emitting element is instead provided as a circuit external to OPU 21.

OPU control circuit 22 further processes the wobble signal or the data signal to acquire the address and outputs the address to first controller 26. OPU control circuit 22 further acquires data from a data segment of the data signal and outputs the data to first controller 26. Specifically, OPU control circuit 22 includes a circuit that processes the wobble signal and outputs address information indicating the focused position and a circuit that binarizes the data signal.

Spindle motor 23 is a motor that rotates optical disc 40. Sled motor 24 is a motor that moves OPU 21 in the radial direction of optical disc 40.

Motor control circuit 25 is a circuit for allowing first controller 26 to control spindle motor 23 and sled motor 24. Motor control circuit 25 controls, for example, the rotational speed of the shaft of spindle motor 23 and the direction and amount of rotation of the shaft of sled motor 24.

First controller 26 uses OPU control circuit 22 to control OPU 21 and uses motor control circuit 25 to control spindle motor 23 and sled motor 24. For example, first controller 26 causes spindle motor 23 and OPU 21 to read recorded data from rotating optical disc 40. First controller 26 is specifically achieved, for example, by a processor, a microcomputer, or a dedicated circuit. First controller 26 may instead be achieved by the combination of at least two of a processor, a microcomputer, or a dedicated circuit.

First communicator 27 is a communication module for allowing optical disc drive device 20 to communicate with signal processing device 30. In other words, the communication module is a communication circuit. First communicator 27 performs, for example, wired communication with second communicator 31 provided in signal processing device 30. First communicator 27 specifically includes receiver 27a and transmitter 27b.

Receiver 27a receives a read command transmitted by signal processing device 30. First controller 26 reads recorded data based on the read command received by receiver 27a.

Transmitter 27b transmits the read recorded data to signal processing device 30 disposed external to optical disc drive device 20.

Memory 28 is a storage device that stores, for example, a control program executed by first controller 26. Memory 28 is specifically achieved, for example, by a semiconductor memory.

[Signal Processing Device]

Signal processing device 30 will next be described. Signal processing device 30 is a device that performs signal processing on recorded data output from optical disc drive device 20 and is a device separate from optical disc drive device 20. Signal processing device 30 is specifically a substrate on which circuit parts, integrated circuits, and other components are mounted. That is, signal processing device 30 is specifically a circuit module. Signal processing device 30 includes second communicator 31, second controller 32, buffer 33, and signal processor 34, as shown in FIG. 3.

Second communicator 31 is a communication module for allowing signal processing device 30 to communicate with optical disc drive device 20. In other words, the communication module is a communication circuit. Second communicator 31 performs, for example, wired communication with first communicator 27 provided in optical disc drive device 20.

Second communicator 31 specifically receives the recorded data transmitted from transmitter 27b. Further, second communicator 31 transmits a read command to first communicator 27 under the control of second controller 32.

Second controller 32 performs storage control in which the recorded data received by second communicator 31 is recorded on buffer 33. Second controller 32 monitors the free space of buffer 33 and causes second communicator 31 to transmit a read command in accordance with the free space of the buffer. Since recorded data is thus transferred from optical disc drive device 20 to signal processing device 30 in response to the read command, a situation in which no recorded data is stored in buffer 33 is avoided.

Second controller 32 is specifically achieved, for example, by a processor, a microcomputer, or a dedicated circuit. Second controller 32 may instead be achieved by the combination of at least two of a processor, a microcomputer, or a dedicated circuit.

Buffer 33 is a storage device that temporarily stores recorded data. Buffer 33 is specifically achieved, for example, by a semiconductor memory.

Buffer 33 can prevent interruption of video when recorded data recorded on optical disc 40 is being played back on the display device.

For example, in the case where two files, file A and file B, are recorded as recorded data on optical disc 40, and files A and B are continuously played back (seamless playback), optical disc drive device 20 first reads file A and then reads file B. In this process, no recorded data can be transferred from optical disc drive device 20 to signal processing device 30 in an access period in which optical disc drive device 20 accesses file B after optical disc drive device 20 reads file A.

In this case, signal processing device 30 reads recorded data corresponding to file A in advance and stores the recorded data in buffer 33. The recorded data corresponding to file A and stored in buffer 33 is then used in the access period to transmit a video signal to the display device. The interruption of the video can thus be avoided.

Further, there is a case where dirt adheres to the recording surface of optical disc 40 or a case where an external factor (such as vibration or impact) acting on optical disc drive device 20 prevents optical disc drive device 20 from reading data in a readout position specified by a read command. In such cases, optical disc drive device 20 carries out a retry process of reading data again in the same location on optical disc 40 as required. In this case, the period from the acquisition of the read command to the transfer of the recorded data is longer than usual. Also in this case, recorded data stored in buffer 33 is used to transmit a video signal to the display device, and the interruption of the video is avoided.

Except the special case described above, the amount of recorded data input to buffer 33 is so designed as to be greater than or equal to the amount of recorded data output from buffer 33. Therefore, in a normal situation, recorded data is gradually accumulated (piled up) in buffer 33.

Signal processor 34 reads recorded data stored in buffer 33 and performs a variety of types of signal processing on the read recorded data to output a video signal from signal processing device 30. Signal processor 34 is specifically achieved, for example, by a processor, a microcomputer, or a dedicated circuit. Signal processor 34 may instead be achieved by the combination of at least two of a processor, a microcomputer, or a dedicated circuit. Second controller 32 and signal processor 34 may instead be achieved as a single processor.

[Recorded Data Readout Operation]

Figure 4:
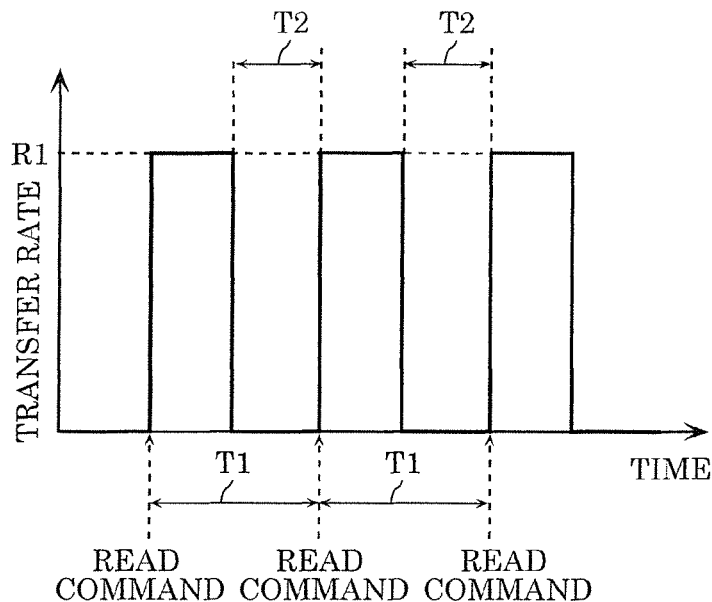
FIG. 4 is a diagrammatic view for describing recorded data readout operation performed by the optical disc drive device according to Embodiment 1.

Recorded data readout operation performed by optical disc drive device 20 will next be described. FIG. 4 is a diagrammatic view for describing the recorded data readout operation performed by optical disc drive device 20. The vertical axis of FIG. 4 represents the transfer rate at which recorded data read by first controller 26 and transmitted by transmitter 27b is transferred. The horizontal axis of FIG. 4 represents time.

The recorded data readout is performed in response to a trigger in the form of a read command transmitted by second communicator 31 of signal processing device 30, as described above. In FIG. 4, the timing at which receiver 27a receives the read command is indicated by each broken arrow.

When the read command is received, first controller 26 starts reading recorded data corresponding to the received read command. At this point, specifically, first controller 26 causes OPU 21 and sled motor 24 to focus the laser beam onto the readout position specified by the read command and causes spindle motor 23 to rotate optical disc 40 at a predetermined rotational speed.

The predetermined rotational speed is specified for each optical disc 40 and recorded, for example, in a disc information area in the innermost portion of the recording layer of optical disc 40. The predetermined rotational speed is also contained in recorded data that forms a predetermined file such as an index file.

Figure 5:
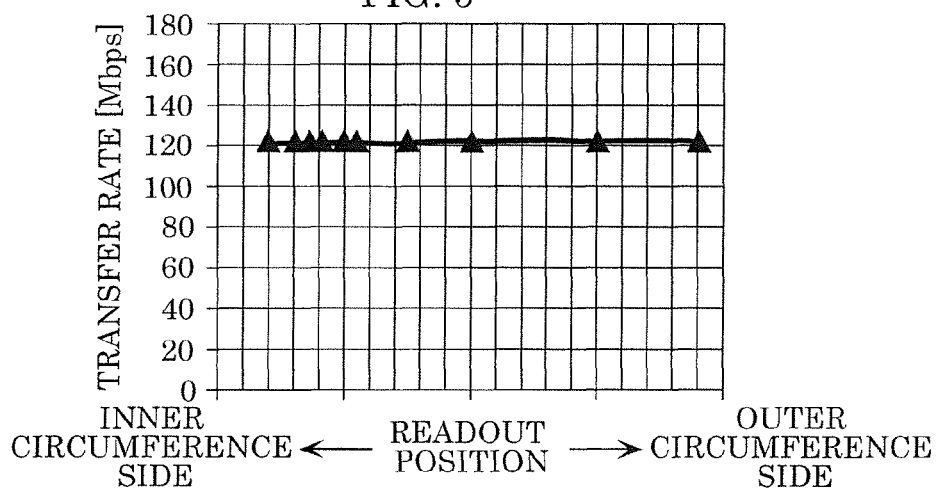
FIG. 5 is a graph showing the relationship between a readout position and a recorded data transfer rate.

The predetermined rotational speed is a rotational speed that allows a fixed recorded data transfer rate [Mbps], as shown in FIG. 5. FIG. 5 is a graph showing the relationship between the readout position and the recorded data transfer rate.

Figure 6:
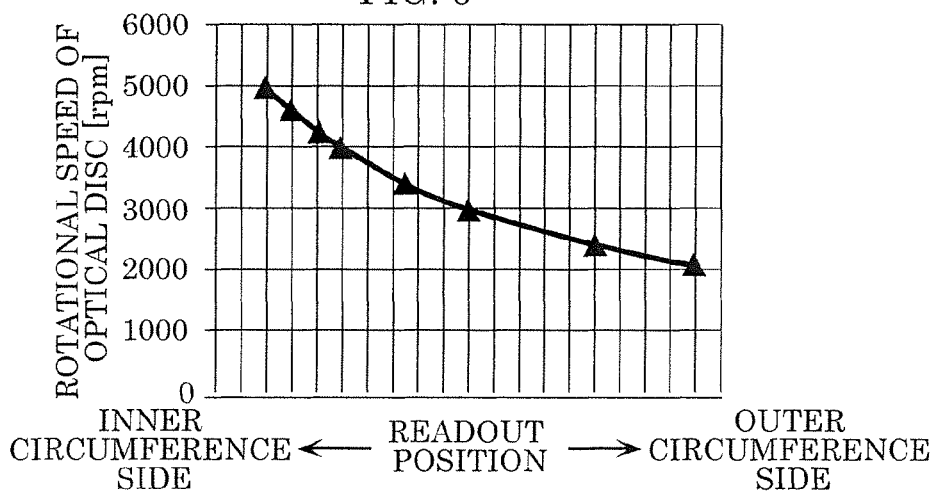
FIG. 6 is a graph showing the relationship between the readout position and the rotational speed of an optical disc.

In optical disc 40, the amount of recorded data per turn varies in accordance with the readout position, and the smaller the amount of recorded data per turn is, the closer to the inner side the readout position is. The predetermined rotational speed therefore changes in accordance with the readout position, and the faster the predetermined rotational speed is, the closer to the inner side the readout position is, as shown in FIG. 6. FIG. 6 shows the relationship between the readout position and the rotational speed of optical disc 40. The method for controlling the rotational speed described above is called constant linear velocity (CLV).

In the example shown in FIG. 4 described above, a read command is transmitted from signal processing device 30 whenever period T1 elapses. Whenever a read command is received, first controller 26 reads recorded data corresponding to the read command, from optical disc 40 at transfer rate R1. The read command specifies the logical address and data length of the recorded data to be read out.

Pause periods T2 shown in FIG. 4 are each a period in which the recorded data readout pauses. Specifically, pause periods T2 are each a period from a first timing at which readout of recorded data corresponding to one read command is completed to a second timing at which readout of recorded data corresponding to a read command following that one read command starts. The second timing is substantially the same as the timing at which the following read command described above is received. It is noted that optical disc 40 rotates at the predetermined rotational speed also in pause periods T2.

[Rotational Speed Control for Reduction in Noise]

An increase in the rotational speed of optical disc 40 causes noise. In the case where optical disc 40 is a UHD BD-ROM, in particular, optical disc 40 rotates at a faster rotational speed compared to the case where optical disc 40 is a BD-ROM, and the magnitudes of wind noise and noise due to looseness of spindle motor 23 increase accordingly. To reduce the noise, it is conceivable to enclose optical disc 40 with a metal enclosure and attach a soundproof sheet onto optical disc drive device 20. Any of the noise reduction measures, however, causes an increase in the number of parts, resulting in an increase in cost.

Figure 7A:
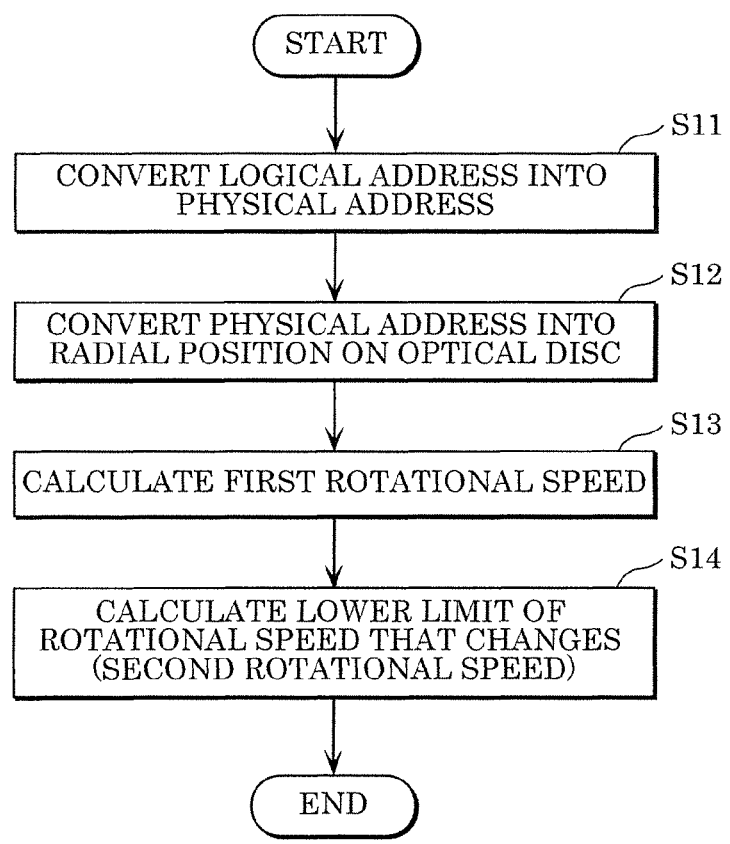
FIG. 7A is a flowchart of a rotational-speed-related process carried out whenever a read command is received.

In view of the situation described above, optical disc drive device 20 controls the rotational speed of optical disc 40 in order to reduce the noise. The rotational speed control will be described below. A description will first be made of a rotational-speed-related process carried out whenever a read command is received. FIG. 7A is a flowchart of the rotational-speed-related process carried out whenever a read command is received. In the following description, the predetermined rotational speed described above is also referred to as a first rotational speed.

When receiver 27a receives a read command, first controller 26 converts the logical address specified by the received read command into a physical address (S11). First controller 26 further converts the physical address into a radial position on optical disc 40 (S12).

First controller 26 then calculates the first rotational speed based on a double-speed specifying value and the radial position obtained in step S12 (S13). The double-speed specifying value is notified, for example, from second controller 32 having acquired recorded data that forms a predetermined file in optical disc 40 to first controller 26. The double-speed specifying value is a value specified for optical disc 40. First controller 26 then calculates a second rotational speed, which is used in the rotational speed control described below and is the lower limit of the rotational speed that changes (S14). The second rotational speed is calculated, for example, by multiplying the first rotational speed by a predetermined coefficient smaller than 1. The second rotational speed is, for example, a value less than the first rotational speed by several to ten percent.

Figure 7B:
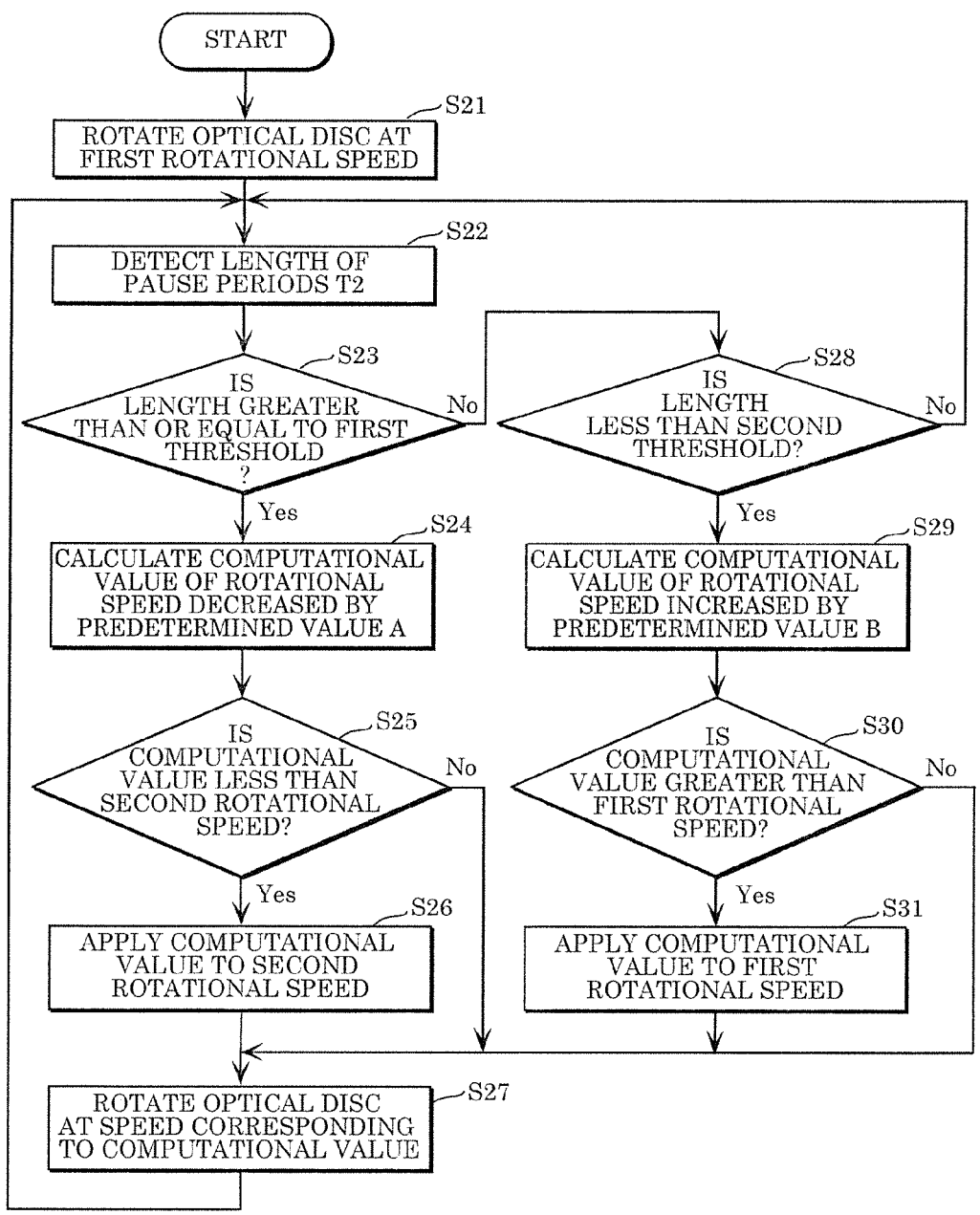
FIG. 7B is a flowchart of rotational speed control according to Embodiment 1.

The rotational speed control performed by optical disc drive device 20 will next be described. FIG. 7B is a flowchart of the rotational speed control performed by optical disc drive device 20.

First controller 26 first causes spindle motor 23 to rotate optical disc 40 at the first rotational speed (S21). During the rotation of optical disc 40 at the first rotational speed, first controller 26 reads, from optical disc 40 whenever a read command is received, recorded data corresponding to the read command, as shown in FIG. 4 described above. First controller 26 further carries out the rotational-speed-related process shown in FIG. 7A whenever a read command is received.

First controller 26 then detects the length of pause periods T2 (S22). First controller 26 then evaluate whether or not the length of pause periods T2 is greater than or equal to a first threshold (S23). A specific value of the first threshold may be specified as appropriate empirically or experimentally.

When pause periods T2 each have a long length, it is estimated that buffer 33 has stored a large amount of recorded data, that is, buffer 33 has a small free space. It is therefore believed that depletion of recorded data stored in buffer 33 is unlikely to occur, and that recorded data does not need to be transferred at high speed.

When determining that the length of pause periods T2 is greater than or equal to the first threshold (Yes in S23), first controller 26 calculates a computational value of a rotational speed by decreasing the current rotational speed by predetermined value A (S24). Predetermined value A is specified as appropriate empirically or experimentally. First controller 26 subsequently determines whether or not the calculated computational value is less than a second rotational speed (S25).

When determining that the calculated computational value is less than the second rotational speed (Yes in S25), first controller 26 applies the computational value to the second rotational speed (S26). Steps S25 and S26 cause the computational value to be restricted to the second rotational speed which is the lower limit of the rotational speed that changes.

Figure 8:
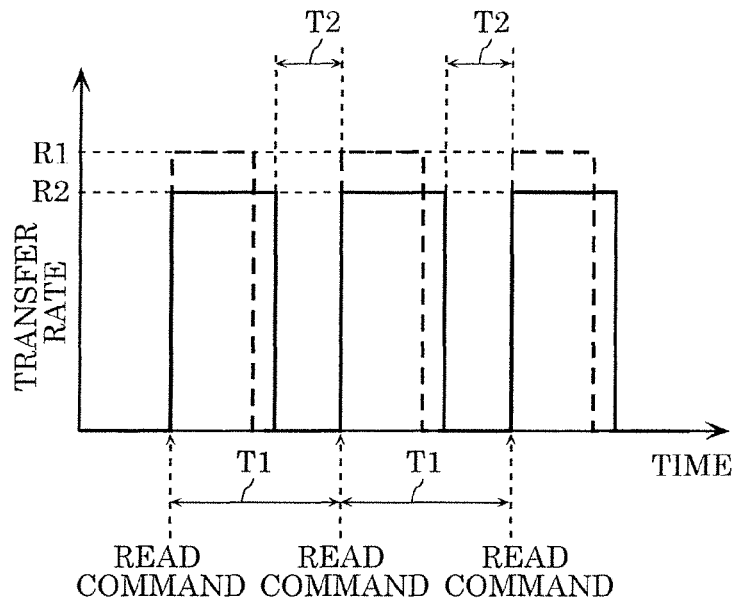
FIG. 8 is a diagrammatic view for describing the recorded data readout operation when the rotational speed of optical disc is slower than a first rotational speed.

When it is determined in step S25 that the computational value is greater than or equal to the second rotational speed (No in S25) and after the process in step S26 is carried out, first controller 26 causes spindle motor 23 to rotate optical disc 40 at a speed corresponding to the computational value (rotational speed greater than 0 but less than the first rotational speed) (S27) and returns to the process in step S22. That is, first controller 26 decreases the rotational speed of optical disc 40 from the current rotational speed and causes the rotational speed to approach the second rotational speed. As a result, the recorded data is transferred as a lower rate. FIG. 8 is a diagrammatic view for describing the recorded data readout operation when the rotational speed of optical disc 40 is slower than the first rotational speed. In FIG. 8, the vertical axis represents the recorded data transfer rate, and the horizontal axis represents time. FIG. 8 corresponds to FIG. 4 and shows the transfer rate in FIG. 4, that is, the transfer rate when optical disc 40 rotates at the first rotational speed, in the form of a broken line.

Provided that the amount of data specified by a single read command is fixed, the transfer rate decreases from R1 to R2, and pause periods T2 shortens accordingly when optical disc 40 rotates at a rotational speed slower than the first rotational speed, as shown in FIG. 8.

As described above, first controller 26 uses the length of pause periods T2 as free space information indicating the free space of the buffer and decreases the rotational speed of optical disc 40 based on the free space information. Specifically, first controller 26 decreases the rotational speed when it is estimated that recorded data does not need to be transferred at high speed because buffer 33 has a small free space. Optical disc drive device 20 can thus reduce the noise with no depletion of recorded data stored in buffer 33. Further, the reduction in noise based on the rotational speed control described above causes no increase in the number of parts of optical disc drive 20, whereby an increase in cost of optical disc drive 20 is suppressed.

On the other hand, when the length of pause periods T2 detected in step S22 each have a short length, it is estimated that buffer 33 has stored a small amount of recorded data, that is, buffer 33 has a large free space. It is therefore believed that depletion of recorded data stored in buffer 33 is likely to occur, and that the recorded data transfer rate cannot be decreased.

In this case, first controller 26 further controls the rotational speed in such a way that the decreased rotational speed approaches the first rotational speed. Specifically, when determining that the length of pause periods T2 is less than the first threshold (No in S23), first controller 26 determines whether or not the length of pause periods T2 is less than a second threshold (S28). The second threshold is set at a value smaller than the first threshold. In other words, setting the second threshold at a value smaller than the first threshold imparts a hysteresis characteristic to the rotational speed control. Frequent change in the rotational speed is therefore avoided. A specific value of the second threshold may be specified as appropriate empirically or experimentally.

When determining that the length of pause periods T2 is less than the second threshold (Yes in S28), first controller 26 calculates a computational value of a rotational speed by increasing the current rotational speed by predetermined value B (S29). Predetermined value B is specified as appropriate empirically or experimentally. First controller 26 subsequently determines whether or not the calculated computational value is greater than the first rotational speed (S30).

When determining that the calculated computational value is greater than the first threshold (Yes in S30), first controller 26 applies the computational value to the first rotational speed (S31). Steps S30 and S31 cause the computational value to be restricted to the first rotational speed, which is the upper limit of the rotational speed that changes.

When it is determined in step S30 that the computational value of the rotational speed is less than or equal to the first threshold (No in S30) and after the process in step S31 is carried out, first controller 26 causes spindle motor 23 to rotate optical disc 40 at the computational value (S27) and returns to the process in step S22. That is, first controller 26 increases the rotational speed of optical disc 40 from the current rotational speed and causes the rotational speed to approach the first rotational speed.

As described above, first controller 26 increases the rotational speed of optical disc 40 based on the length of pause periods T2 during the period in which the rotational speed of optical disc 40 is slower than the first rotational speed. In other words, the recorded data transfer rate is increased. Optical disc drive device 20 can thus prevent depletion of the recorded data stored in buffer 33.

During the period in which the rotational speed of optical disc 40 decreases, first controller 26 may immediately cause the rotational speed back to the first rotational speed based on the continuity of the logical address specified by a read command received by receiver 27a.

Specifically, first controller 26 determines whether or not recorded data corresponding to a first read command is recorded data having a logical address that is not continuous with the logical address of recorded data corresponding to a second read command that has been received immediately before the first read command is received. When determining that the two logical addresses are not continuous with each other, first controller 26 rotates optical disc 40 at the first rotational speed, that is, the rotational speed specified for optical disc 40.

For example, in the case where logical address A1 and data length L1 are specified in the second read command, when logical address A2 specified in the first read command is A1+L1, first controller 26 can determine that the two logical addresses are continuous with each other. When logical address A2 specified in the first read command is not A1+L1, first controller 26 can determine that the two logical addresses are not continuous with each other.

For example, when a user presses a skip button or a return button on a remote control of playback device 10, there is no continuity between the logical addresses any more. In this case, recorded data accumulated in buffer 33 are discarded, and recorded data need to be newly accumulated in buffer 33. In such a case, the rotational speed is immediately increased to the first rotational speed to facilitate the accumulation of recorded data in buffer 33.

In the case where optical disc 40 is a multilayer disc, and a change in the readout position involves two layers (in the case where the readout position changes from an L0 layer to an L1 layer, for example), the physical addresses are not continuous with each other, but the logical addresses specified by read commands are continuous with each other.

Variation of Embodiment 1

In the rotational speed control described above, the length of pause periods T2 is used as the free space information. The read command frequency may instead be used as the free space information. Specifically, first controller 26 may decrease the rotational speed of optical disc 40 based on comparison of the length of periods T1 shown in FIG. 4 described above in place of the length of pause periods T2 with a first threshold. Similarly, first controller 26 may increase the rotational speed of optical disc 40 based on comparison of the length of periods T1 with a second threshold.

Still instead, the ratio of pause periods T2 to periods T1 may be used as the free space information. Specifically, first controller 26 may decrease the rotational speed of optical disc 40 based on comparison of the ratio of pause periods T2 to periods T1 with the first threshold. Similarly, first controller 26 may increase the rotational speed of optical disc 40 based on comparison of the ratio of pause periods T2 to periods T1 with a second threshold.

Embodiment 2

The first rotational speed increases as the readout position moves toward inner side, as shown in FIG. 6 described above. That is, when optical disc 40 rotates at the first rotational speed, the noise increases as the readout position moves toward inner side.

Figure 9:
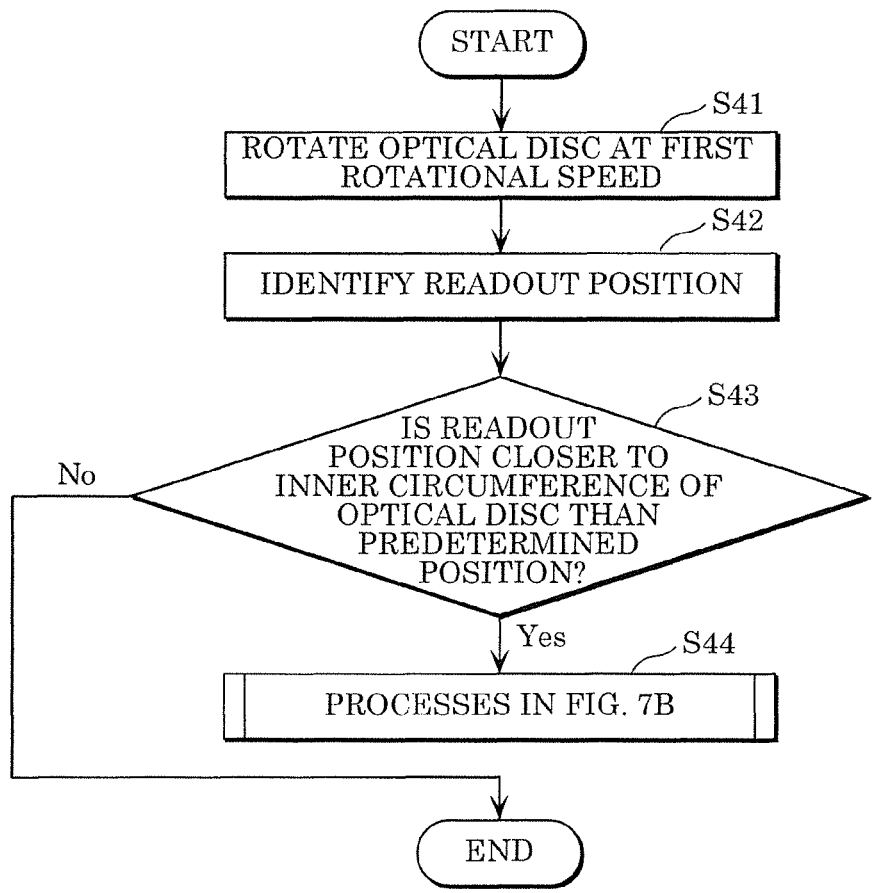
FIG. 9 is a flowchart of rotational speed control according to Embodiment 2.

In view of the fact described above, the rotational speed control described above may be selectively performed only when the readout position is closer to the inner circumference of optical disc 40 than a predetermined position, that is, only when the noise increases. Such rotational speed control according to Embodiment 2 will be described below. FIG. 9 is a flowchart of the rotational speed control according to Embodiment 2. The following description will be primarily made of differences from the rotational speed control according to Embodiment 1 shown in FIG. 7B, and no description of the previously described items will be made as appropriate.

First controller 26 causes spindle motor 23 to rotate optical disc 40 at the first rotational speed specified for optical disc 40, as shown in FIG. 9 (S41). During the rotation of optical disc 40 at the predetermined first rotational speed, first controller 26 reads, from optical disc 40 whenever a read command is received, recorded data corresponding to the read command.

First controller 26 subsequently identifies the readout position (S42). The readout position is identified based on the logical address specified in the read command, as shown in FIG. 7A described above.

First controller 26 then determines whether or not the identified readout position is closer to the inner circumference of optical disc 40 than a predetermined position (S43). The predetermined position may be specified as appropriate empirically or experimentally based, for example, on noise level measured value.

When determining that the readout position is closer to the inner circumference than the predetermined position (Yes in S43), first controller 26 carries out the processes shown in FIG. 7B (S44). When determining that the readout position is closer to the outer circumference of optical disc 40 than the predetermined position (No in S43), first controller 26 stops controlling the rotational speed.

As described above, the processes shown in FIG. 7B are selectively carried out only when the readout position is closer to the inner circumference than the predetermined position, whereby optical disc drive device 20 can efficiently reduce the noise.

Embodiment 3

Figure 10:
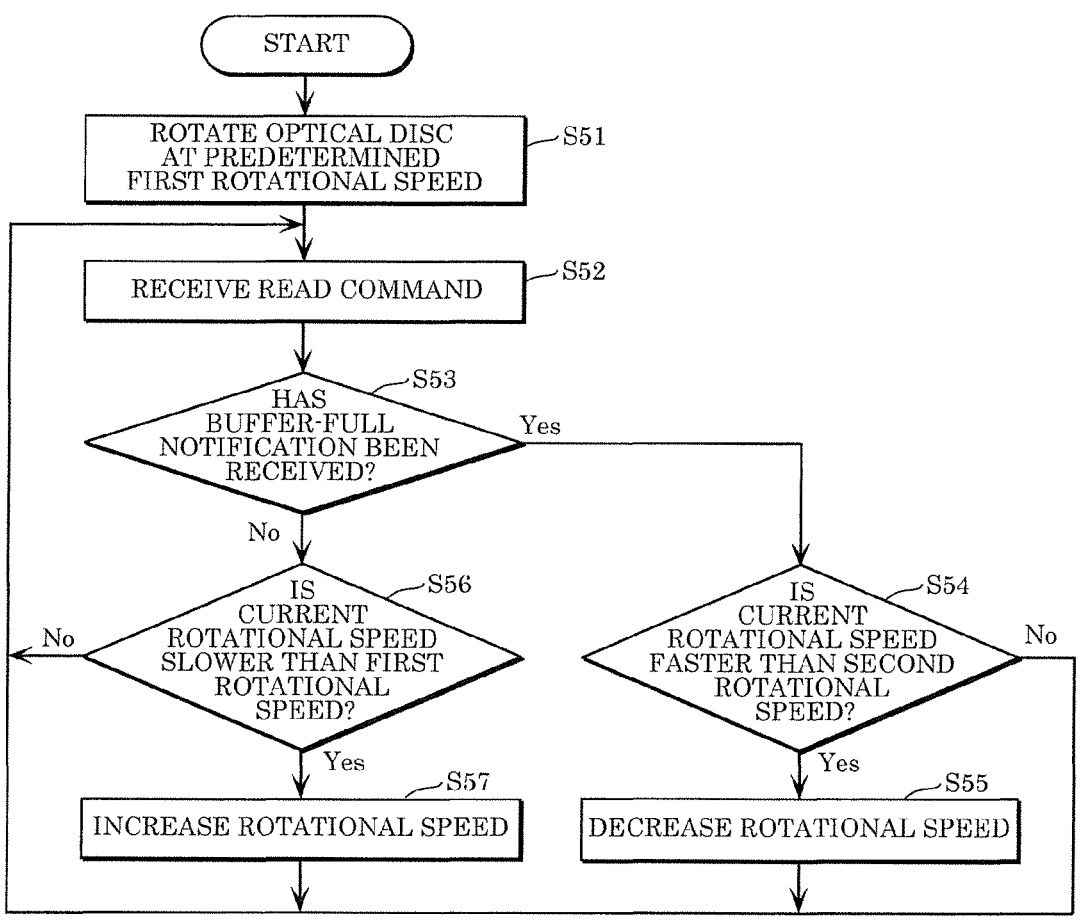
FIG. 10 is a flowchart of rotational speed control according to Embodiment 3.

In Embodiments 1 and 2 described above, the rotational speed control uses the free space information, such as pause periods T2, detected by optical disc drive device 20 and indirectly indicating the storage space of buffer 33. The free space information may instead be information transmitted from signal processing device 30. In Embodiment 3, a description will be made of control of the rotational speed of optical disc 40 based on free space information transmitted from signal processing device 30. FIG. 10 is a flowchart of the rotational speed control according to Embodiment 3.

In the rotational speed control according to Embodiment 3, the free space information is buffer-full notification indicating that buffer 33 has a small free space. Second controller 32 of signal processing device 30 monitors the free space of buffer 33 and causes second communicator 31 to transmit the buffer-full notification when the amount of free space in the buffer is less than a predetermined amount. The predetermined amount may be specified as appropriate empirically or experimentally.

First controller 26 causes spindle motor 23 to rotate optical disc 40 at the predetermined first rotational speed specified for optical disc 40, as shown in FIG. 10 (S51). During the rotation of optical disc 40 at the predetermined first rotational speed, receiver 27a receives a read command (S52). Although not shown, whenever a read command is received, first controller 26 reads, from optical disc 40, recorded data corresponding to the read command.

First controller 26 then determines whether or not the buffer-full notification has been received immediately before the received read command (S53). When determining that the buffer-full notification has been received immediately before the received read command (Yes in S53), first controller 26 determines whether or not the current rotational speed is faster than the second rotational speed (S54). When determining that the current rotational speed is slower than or equal to the second rotational speed (No in S54), first controller 26 causes receiver 27a to keep receiving a read command (S52).

On the other hand, when determining that the current rotational speed is faster than the second rotational speed (Yes in S54), first controller 26 causes spindle motor 23 to decrease the rotational speed of optical disc 40 (S55). The reason for this is that when the buffer-full notification has been received, it is believed that depletion of recorded data stored in buffer 33 is unlikely to occur, and that recorded data does not need to be transferred at high speed.

Figure 11:
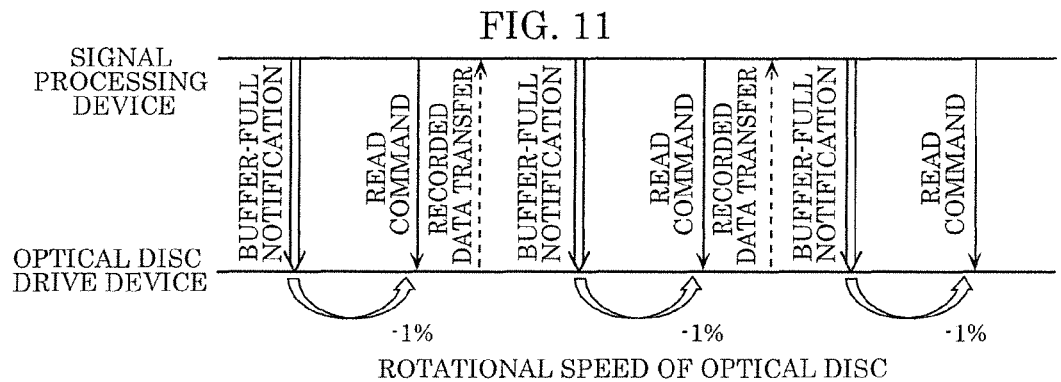
FIG. 11 is a diagram for describing a case where the rotational speed of the optical disc decreases in the rotational speed control according to Embodiment 3.

In step S55, first controller 26 decreases the rotational speed of optical disc 40 by a first predetermined proportion of the predetermined first rotational speed. The first predetermined proportion is, for example, 1%. The process in step S55 is diagrammatically shown in FIG. 11. FIG. 11 describes the case where the rotational speed of optical disc 40 decreases in the rotational speed control according to Embodiment 3.

First controller 26 decreases the rotational speed of optical disc 40 by the first predetermined proportion of the predetermined first rotational speed whenever a read command immediately before which the buffer-full notification has been transmitted is received, as shown in FIG. 11. Optical disc drive device 20 can thus reduce the noise with no depletion of recorded data stored in buffer 33.

On the other hand, when determining in S53 that no buffer-full notification has been received immediately before the received read command (No in S53), first controller 26 determines whether or not the current rotational speed is slower than the predetermined first rotational speed (S56). When determining that the current rotational speed is faster than or equal to the predetermined first rotational speed (No in S56), first controller 26 causes receiver 27a to keep receiving a read command (S52).

On the other hand, when determining that the current rotational speed is slower than the predetermined first rotational speed (Yes in S56), first controller 26 causes spindle motor 23 to increase the rotational speed of optical disc 40 (S57). The reason for this is that since no buffer-full notification has been received, lowering the recorded data transfer rate is likely to cause depletion of recorded data stored in buffer 33. In other words, the process in step S57 allows optical disc drive device 20 to prevent depletion of recorded data stored in buffer 33.

Figure 12:
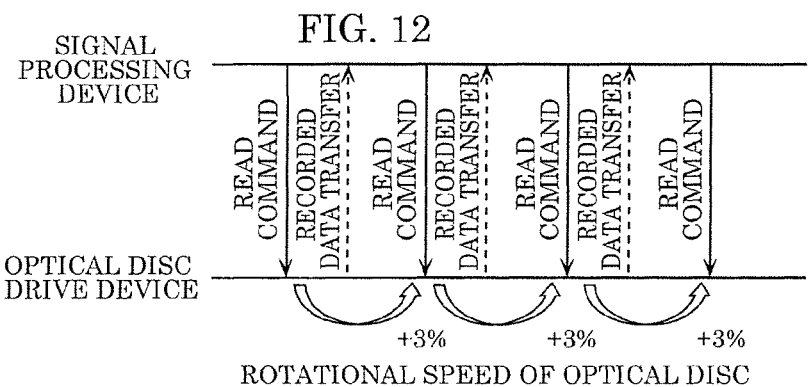
FIG. 12 is a diagram for describing a case where the rotational speed of the optical disc increases in the rotational speed control according to Embodiment 3.

In step S57, first controller 26 increases the rotational speed of optical disc 40, for example, by a second predetermined proportion of the predetermined first rotational speed. The second predetermined proportion is, for example, 3%. The process in step S57 is diagrammatically shown in FIG. 12. FIG. 12 describes the case where the rotational speed of optical disc 40 increases in the rotational speed control according to Embodiment 3.

First controller 26 increases the rotational speed of optical disc 40 by the second predetermined proportion of the predetermined first rotational speed whenever a read command immediately before which the buffer-full notification has not been transmitted is received, as shown in FIG. 12. In step S57, first controller 26 may adjust the amount of increase in such a way that the rotational speed of optical disc 40 does not exceed the predetermined first rotational speed.

Variation of Embodiment 3

The rotational speed control according to Embodiment 3 is an example of the rotational speed control using the free space information transmitted from signal processing device 30. The free space information is not limited to the buffer-full notification and may instead be information in another aspect.

For example, the free space information may be notification indicating that the amount of free space in the buffer is greater than a predetermined amount. In this case, assuming that another read command has been received immediately before one read command is received, first controller 26 decreases the rotational speed of optical disc 40, whereas assuming that the notification described above has been received immediately before one read command is received, first controller 26 increases the rotational speed of optical disc 40.

Still instead, information directly indicating the free space of buffer 33 may be transmitted from signal processing device 30. In this case, first controller 26 decreases or increases the rotational speed, for example, by comparing the received free space information with a threshold.

The rotational speed control according to Embodiment 3 may be combined with the rotational speed control according to Embodiment 2. That is, also in the rotational speed control according to Embodiment 3, the rotational speed control after step S52 may be selectively performed only when the readout position is closer to the inner circumference than the predetermined position. Optical disc drive device 20 can thus efficiently reduce the noise.

Embodiment 4

Figure 13:
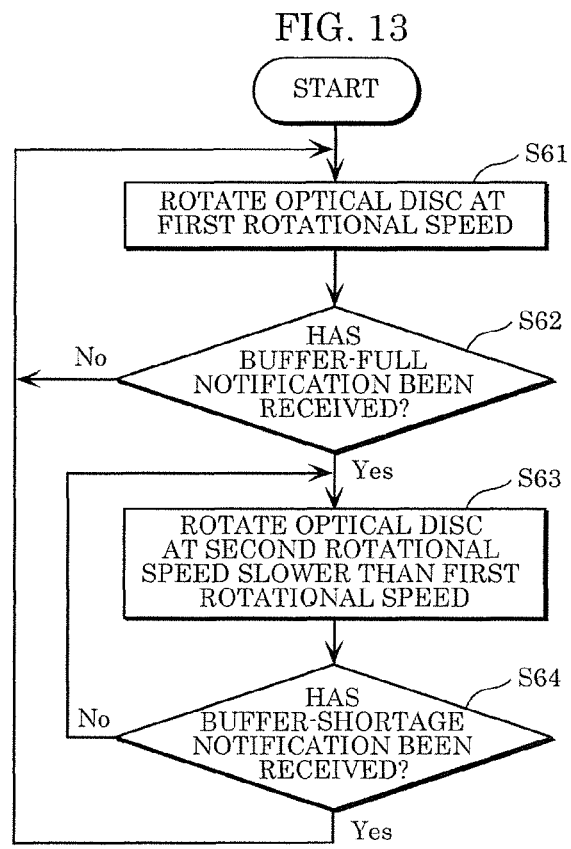
FIG. 13 is a flowchart of rotational speed control according to Embodiment 4.

Signal processing device 30 may transmit buffer-shortage notification indicating that buffer 33 has a large free space in addition to the buffer-full notification. The following description will be made of control the rotational speed of optical disc 40 using the buffer-full notification and buffer-shortage notification. FIG. 13 is a flowchart of the rotational speed control according to Embodiment 4.

In the rotational speed control according to Embodiment 4, second controller 32 of signal processing device 30 monitors the free space of buffer 33 and causes second communicator 31 to transmit the buffer-full notification when the amount of recorded data stored in buffer 33 is greater than a first threshold. Second controller 32 further monitors the free space of buffer 33 and causes second communicator 31 to transmit the buffer-shortage notification when the amount of recorded data stored in buffer 33 is less than a second threshold that is smaller than the first threshold. The buffer-full notification is an example of first information, and the buffer-shortage notification is an example of second information. The first and second thresholds may be specified as appropriate empirically or experimentally. Second communicator 31 transmits the buffer-full notification or the buffer-shortage notification to first communicator 27 of optical disc drive device 20 upon reception of the notification described above.

First controller 26 first causes spindle motor 23 to rotate optical disc 40 at the first rotational speed (S61), as shown in FIG. 13. During the rotation of optical disc 40 at the first rotational speed, first controller 26 determines whether or not receiver 27a has received the buffer-full notification (S62). When determining that receiver 27a has received the buffer-full notification (Yes in S62), first controller 26 decreases the rotational speed of optical disc 40 from the first rotational speed to the second rotational speed (S63). When determining that receiver 27a has received no buffer-full notification (No in S62), first controller 26 keeps the rotational speed of optical disc 40 and rotates optical disc 40 at the first rotational speed (S61).

During the rotation of optical disc 40 at the second rotational speed (S63), first controller 26 determines whether or not receiver 27a has received the buffer-shortage notification (S64). When determining that receiver 27a has received the buffer-shortage notification (Yes in S64), first controller 26 increases the rotational speed of optical disc 40 from the second rotational speed to the first rotational speed (S61). When determining that receiver 27a has received no buffer-shortage notification (No in S64), first controller 26 keeps the rotational speed of optical disc 40 and rotates optical disc 40 at the second rotational speed (S63).

Figure 14:
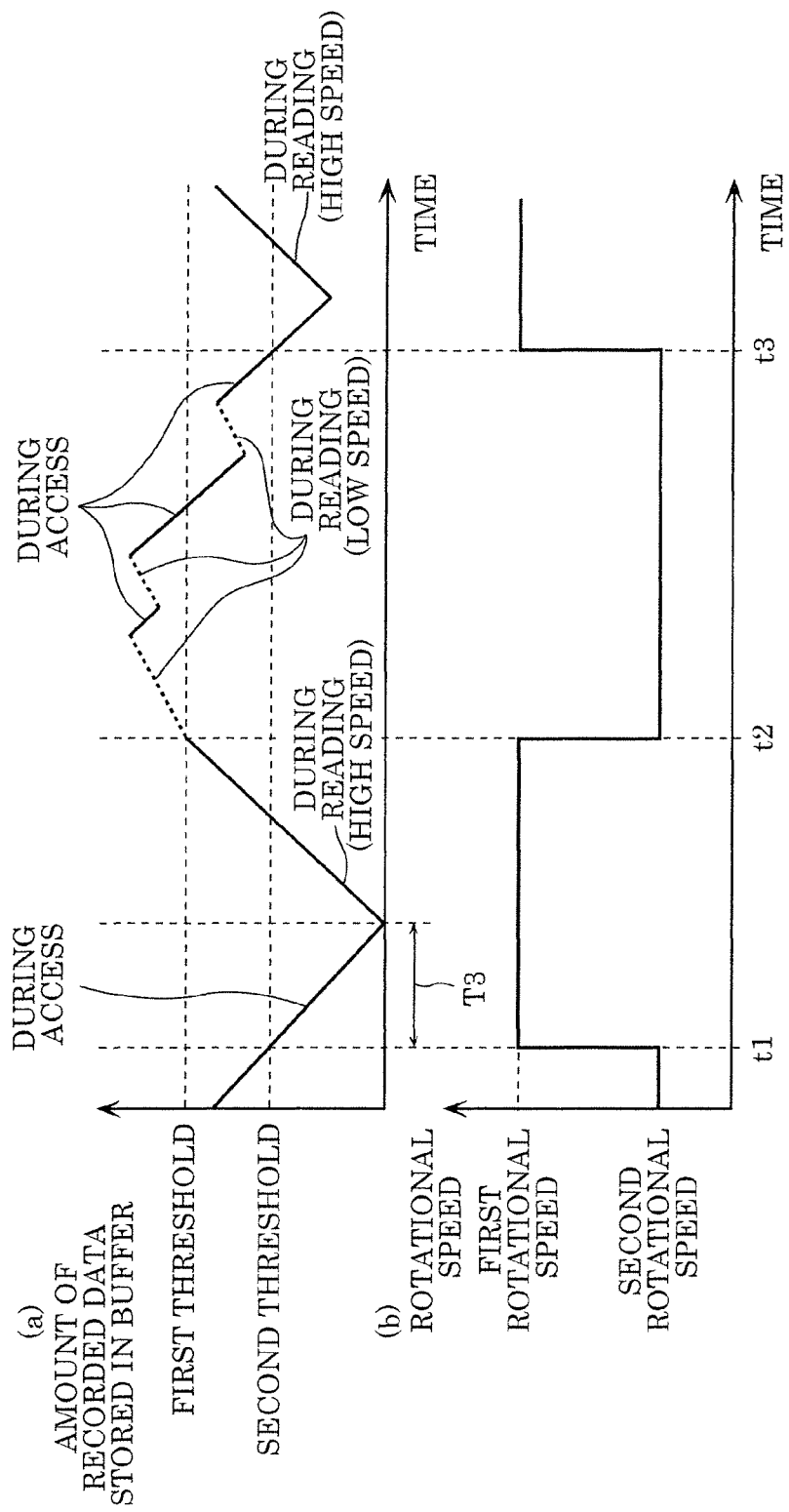
FIG. 14 shows the amount of recorded data stored in a buffer in the rotational speed control according to Embodiment 4.

FIG. 14 shows the amount of recorded data stored in buffer 33 in the rotational speed control according to Embodiment 4 described above. Portion (a) of FIG. 14 shows the amount of recorded data stored in buffer 33, and portion (b) of FIG. 14 shows the rotational speed.

In the period in which OPU 21 seeks a desired data recorded position on optical disc 40 (during access), no recorded data is stored in buffer 33, but the amount of recorded data stored in buffer 33 decreases because the recorded data is continuously output to signal processor 34, as shown in FIG. 14. At timing t1 or t3, at which the amount of recorded data stored in buffer 33 becomes less than the second threshold, second controller 32 causes second communicator 31 to transmit the buffer-shortage notification. First controller 26 increases the rotational speed of optical disc 40 from the second rotational speed to the first rotational speed as triggered by the reception of the buffer-shortage notification by receiver 27a. Recorded data can thus be rapidly accumulated in buffer 33 due to reading after the access is completed, whereby depletion of recorded data stored in buffer 33 can be avoided when the following access occurs.

On the other hand, during the reading period in which OPU 21 reads recorded data from optical disc 40, the recorded data is stored in buffer 33, and the amount of recorded data stored in buffer 33 increases accordingly ("during reading (high speed)" in potion (a) of FIG. 14). At timing t2, at which the amount of recorded data stored in buffer 33 becomes greater than the first threshold, second controller 32 causes second communicator 31 to transmit the buffer-full notification. First controller 26 decreases the rotational speed of optical disc 40 from the first rotational speed to the second rotational speed as triggered by the reception of the buffer-full notification by receiver 27a.

The recorded data stored in buffer 33 thus moderately increases ("during reading (low speed)" in potion (a) of FIG. 14). Further, the noise is reduced.

In practice, longest access period T3 is specified in the standard for optical disc 40, and the length of the in-access period cannot be longer than longest access period T3 (shown in FIG. 14). Further, the gradient in accordance with which the amount of recorded data stored in buffer 33 decreases during the in-access period is also specified in the standard for optical disc 40. The second threshold is set as a value that prevents depletion of recorded data stored in buffer 33 based, for example, on thus specified longest access period T3 and gradient.

SUMMARY

As described above, optical disc drive device 20 includes spindle motor 23, which rotates optical disc 40, OPU 21, first controller 26, which causes spindle motor 23 and OPU 21 to read recorded data from rotating optical disc 40, and transmitter 27b which transmits the read recorded data to signal processing device 30 disposed external to optical disc drive device 20. The recorded data transmitted by transmitter 27b is stored in buffer 33, which is provided in signal processing device 30. First controller 26 decreases the rotational speed of optical disc 40 based on the free space information indicating the free space of buffer 33. Spindle motor 23 is an example of a motor, and first controller 26 is an example of a controller.

Optical disc drive device 20 can thus reduce the noise while avoiding depletion of recorded data stored in buffer 33. That is, optical disc drive device 20 that allows reduction in noise produced when optical disc 40 rotates can be achieved.

Optical disc drive device 20 may further include receiver 27a which receives a read command transmitted by signal processing device 30. Whenever a read command is received, first controller 26 may read, from optical disc 40 recorded data corresponding to the read command, and use, as the free space information, the length of pause periods T2, which are each a period from the timing at which readout of recorded data corresponding to one received read command is completed to the timing at which readout of recorded data corresponding to a read command following that one read command is started.

Optical disc drive device 20 can thus reduce the noise while avoiding depletion of recorded data stored in buffer 33 by estimating the free space of buffer 33 based on pause periods T2.

First controller 26 may decrease the rotational speed of optical disc 40 when the length of pause periods T2 is greater than or equal to the first threshold.

Optical disc drive device 20 can thus reduce the noise while avoiding depletion of recorded data stored in buffer 33 by comparing pause periods T2 with the first threshold.

First controller 26 may increase the rotational speed of optical disc 40 when the length of pause periods T2 is less than the second threshold during the period in which the rotational speed of optical disc 40 is decreased.

Optical disc drive device 20 can thus avoid depletion of recorded data stored in buffer 33 by comparing pause periods T2 with the second threshold.

The second threshold may be smaller than the first threshold.

A hysteresis characteristic is thus imparted to the rotational speed control, whereby frequent change in the rotational speed is avoided.

Optical disc drive device 20 may further include receiver 27a which receives the free space information transmitted by signal processing device 30. First controller 26 may decrease the rotational speed of optical disc 40 based on the received free space information. The free space information is, for example, the buffer-full notification.

Optical disc drive device 20 can thus reduce the noise while avoiding depletion of recorded data stored in buffer 33 by using the free space information transmitted by signal processing device 30.

Receiver 27a may further receive a read command transmitted from signal processing device 30. Whenever a read command is received, first controller 26 may read, from optical disc 40, recorded data corresponding to the read command, and decrease the rotational speed of optical disc 40 based on whether or not the buffer-full notification has been received immediately before one read command is received. For example, first controller 26 may decrease the rotational speed of optical disc 40 when the free space information has been received immediately before one read command is received. First controller 26 may increase the rotational speed of optical disc 40 when another read command has been received immediately before one read command is received.

Optical disc drive device 20 can thus reduce the noise while avoiding depletion of recorded data stored in buffer 33 by using the buffer-full notification transmitted from signal processing device 30.

First controller 26 may further evaluate whether or not the recorded data readout position on optical disc 40 is closer to the inner circumference of optical disc 40 than a predetermined position. When determining that the recorded data readout position is closer to the inner circumference than the predetermined position, first controller 26 may decrease the rotational speed of optical disc 40 based on the free space information.

Selectively performing the rotational speed control only when the readout position is closer to the inner circumference than the predetermined position as described above allows optical disc drive device 20 to efficiently reduce the noise.

First controller 26 may decrease the rotational speed of optical disc 40 to be slower than the rotational speed specified for optical disc 40 based on the free space information. The rotational speed to which the rotational speed of optical disc 40 is decreased is, for example, the predetermined first rotational speed described above.

Optical disc drive device 20 can thus reduce the noise by decreasing the rotational speed of optical disc 40 to be slower than the rotational speed specified for optical disc 40.

Optical disc drive device 20 may further include receiver 27a which receives a read command transmitted by signal processing device 30. Whenever a read command is received, first controller 26 may read, from optical disc 40, recorded data corresponding to the read command, and decrease the rotational speed of optical disc 40 to be slower than the rotational speed specified for optical disc 40 based on the free space information. During the period in which the rotational speed of optical disc 40 decreases, first controller 26 may rotate optical disc 40 at the rotational speed specified for optical disc 40 when recorded data corresponding to an received first read command is recorded data having an address that is not continuous with the address of recorded data corresponding to a second read command that has been received immediately before the first read command is received.

As a result, when recorded data accumulated in buffer 33 are discarded, the rotational speed is increased to the rotational speed before the decrease in the rotational speed to facilitate the accumulation of recorded data in buffer 33.

First controller 26 may decrease the rotational speed of optical disc 40 when the amount of recorded data stored in buffer 33 is greater than the first threshold, whereas first controller 26 may increase the rotational speed of optical disc 40 when the amount of recorded data stored in buffer 33 is less than the second threshold that is smaller than the first threshold.

Optical disc drive device 20 can thus reduce the noise while avoiding depletion of recorded data stored in buffer 33.

Optical disc drive device 20 may further include receiver 27a which receives the buffer-full notification indicating that the amount of recorded data stored in buffer 33 becomes greater than the first threshold, and the buffer-shortage notification indicating that the amount of recorded data stored in buffer 33 becomes less than the second threshold that is smaller than the first threshold. The buffer-full notification is an example of the first information, and the buffer-shortage notification is an example of the second information. First controller 26 decreases the rotational speed of optical disc 40 when receiver 27a receives the buffer-full notification, whereas first controller 26 increases the rotational speed of optical disc 40 when receiver 27a receives the buffer-shortage notification.

Optical disc drive device 20 can thus reduce the noise while avoiding depletion of recorded data stored in buffer 33 by using the buffer-full notification and the buffer-shortage notification.

Playback device 10 includes optical disc drive device 20 and signal processing device 30.

Playback device 10 can thus reduce the noise while avoiding depletion of recorded data stored in buffer 33. That is, playback device 10 that allows reduction in noise produced when optical disc 40 rotates can be achieved.

Other Embodiments

The embodiments have been described above as examples of the technology disclosed in the present application. The technology in the present disclosure is not limited to the embodiments and is also applicable to embodiments including changes, replacements, additions, omissions, and other modifications as appropriate. Further, the components described in the above embodiments can be combined with one another to create a new embodiment. Such other embodiments will be collectively described below.

For example, in the embodiments described above, the components, such as the first controller and the second controller, may each be formed of dedicated hardware or may be achieved by executing a software program suitable for the component. The components may still instead be achieved by a program executer such as a CPU or a processor that reads and executes a software program recorded on a recording medium such as a hard disk or a semiconductor memory.

The OPU control circuit, the motor control circuit, the first controller, the first communicator, the second communicator, the second controller, the buffer, and the signal processor described in the above embodiments may be achieved as a single integrated circuit chip as an SoC (System-on-a-chip). The integrated circuit chip is, for example, part of the signal processing device.

The type of the optical disc described in the above embodiments is not limited to a specific type. The optical disc may, for example, be an AD (Archival Disc®), a DVD (Digital Versatile Disc), and a CD (Compact Disc).

The order of a plurality of processes in the optical disc rotational speed control described in each of the above embodiments is presented by way of example. The order of the plurality of processes may be changed, or part of the plurality of processes may be concurrently carried out.

A comprehensive or specific aspect of the present disclosure is not limited to an optical disc drive device or a playback device and may be achieved as a system or a method. A comprehensive or specific aspect of the present disclosure may instead be achieved by an integrated circuit, a computer program, or a recording medium such as a computer readable CD-ROM.

For example, the present disclosure may be achieved as a method for controlling the optical disc drive device described in any of the embodiments. Instead, the present disclosure may be achieved as a program that causes a computer to carry out the control method described above or may be achieved as a non-transitory recording medium on which the program has been recorded.

The embodiments have been described above as examples of the technology in the present disclosure. To this end, the accompanying drawings and the detailed descriptions have been provided.

The components described in the accompanying drawings and the detailed descriptions may therefore include not only essential components for achievement of the object but also components that are not essential to achieve the object and are provided to describe the technology described above. Therefore, the description of the non-essential components in the accompanying drawings and the detailed descriptions should not instantly lead to conclusion that the non-essential components are essential.

Since the embodiments described above are presented by way of example to describe the technology in the present disclosure, a variety of changes, replacements, additions, omissions, and other modifications can be made to the embodiments to the extent that they fall within the claims or the scope equivalent thereto.

INDUSTRIAL APPLICABILITY

The present disclosure is useful for an optical disc drive device that allows reduction in noise.

The invention claimed is:
1. An optical disc drive device, comprising:
a motor that rotates an optical disc;
an optical pickup unit (OPU);
a controller that causes the motor and the OPU to read recorded data from the optical disc that is rotating; and
a transmitter that transmits the recorded data that has been read, to a signal processing device disposed external to the optical disc drive device,
wherein the recorded data transmitted by the transmitter is stored in a buffer provided in the signal processing device,
the controller decreases a rotational speed of the optical disc based on free space information indicating a free space of the buffer, and
wherein the controller:
further determines whether a readout position on the optical disc is closer to an inner circumference of the optical disc than a predetermined position, the readout position being a position where the recorded data is read; and
when determining that the readout position is closer to the inner circumference than the predetermined position, decreases the rotational speed of the optical disc based on the free space information.

2. The optical disc drive device according to claim 1, further comprising:
a receiver that receives a read command transmitted by the signal processing device,
wherein whenever the read command is received, the controller reads, from the optical disc, the recorded data corresponding to the read command, and
the controller uses, as the free space information, a length of a period from a timing at which readout of the recorded data corresponding to one read command received is completed to a timing at which readout of the recorded data corresponding to a read command following the one read command is started.

3. The optical disc drive device according to claim 2, wherein the controller decreases the rotational speed of the optical disc when the length of the period is greater than or equal to a first threshold.

4. The optical disc drive device according to claim 3, wherein the controller increases the rotational speed of the optical disc when the length of the period is less than a second threshold during a period in which the rotational speed of the optical disc is decreased.

5. The optical disc drive device according to claim 4, wherein the second threshold is smaller than the first threshold.

6. The optical disc drive device according to claim 1, further comprising:
a receiver that receives the free space information transmitted by the signal processing device, wherein the controller decreases the rotational speed of the optical disc based on the free space information received.

7. The optical disc drive device according to claim 1, wherein the controller decreases, based on the free space information, the rotational speed of the optical disc to be slower than a rotational speed specified for the optical disc.

8. An optical disc playback device comprising:
the optical disc drive device according to claim 1; and
the signal processing device.

9. An optical disc drive device, comprising:
a motor that rotates an optical disc;
an optical pickup unit (OPU);
a controller that causes the motor and the OPU to read recorded data from the optical disc that is rotating;
a transmitter that transmits the recorded data that has been read, to a signal processing device disposed external to the optical disc drive device; and,
a receiver that receives the free space information transmitted by the signal processing device,
wherein the recorded data transmitted by the transmitter is stored in a buffer provided in the signal processing device,
the controller decreases a rotational speed of the optical disc based on free space information indicating a free space of the buffer,
the controller decreases the rotational speed of the optical disc based on the free space information received,
the receiver further receives a read command transmitted by the signal processing device, and
the controller:
reads, from the optical disc whenever the read command is received, the recorded data corresponding to the read command; and
decreases the rotational speed of the optical disc based on whether the free space information has been received immediately before one read command is received.

10. The optical disc drive device according to claim 9, wherein the controller decreases the rotational speed of the optical disc when the free space information has been received immediately before the one read command is received.

11. The optical disc drive device according to claim 9, wherein the controller increases the rotational speed of the optical disc when another read command has been received immediately before the one read command is received.

12. An optical disc playback device comprising:
the optical disc drive device according to claim 9; and
the signal processing device.

13. An optical disc drive device, comprising:
a motor that rotates an optical disc;
an optical pickup unit (OPU);
a controller that causes the motor and the OPU to read recorded data from the optical disc that is rotating:
a transmitter that transmits the recorded data that has been read, to a signal processing device disposed external to the optical disc drive device; and
a receiver that receives a read command transmitted by the signal processing device,
wherein the recorded data transmitted by the transmitter is stored in a buffer provided in the signal processing device, and
the controller decreases a rotational speed of the optical disc based on free space information indicating a free space of the buffer, and
wherein the controller:
reads, from the optical disc whenever the read command is received, the recorded data corresponding to the read command;
decreases, based on the free space information, the rotational speed of the optical disc to be slower than a rotational speed specified for the optical disc; and
during a period in which the rotational speed of the optical disc decreases, rotates the optical disc at a rotational speed specified for the optical disc when the recorded data corresponding to a first read command received is recorded data having an address that is not continuous with an address of the recorded data corresponding to a second read command that has been received immediately before the first read command is received.

14. An optical disc playback device comprising:
the optical disc drive device according to claim 13; and
the signal processing device.

* * * * *